3,004,930
POLYMERIZATION CATALYST

Robert M. Engelbrecht and Joseph Q. Snyder, El Dorado, Ark., assignors to Monsanto Chemical Company, St. Louis, Mo., a corporation of Delaware
No Drawing. Filed June 22, 1959, Ser. No. 821,690
6 Claims. (Cl. 252—442)

This invention relates to a catalyst comprising a silica-alumina impregnated with a minor amount of a gallium halide and to a process for polymerizing olefins in the presence of this catalyst.

It is an object of this invention to provide an improved catalyst having particular utility in the polymerization of olefins. It is also an object of this invention to provide an improved process for the polymerization of olefins. Additional objects will become apparent from the description of this invention.

The novel catalyst of this invention is prepared by impregnating a silica-alumina with a minor amount of a gallium halide, such as, gallium chloride, gallium bromide, gallium iodide or gallium fluoride. Gallium chloride is used to prepare particularly preferred catalysts of this invention. While catalysts comprising a silica-alumina and any minor amount of a gallium halide are encompassed by this invention, those catalysts containing from 0.05 to 10% by weight of total composition of the gallium halide are extremely useful and those compositions containing from 0.1 to 5% by weight of total composition of the gallium halide are particularly preferred. The following example is a specific illustration of a manner in which the novel catalysts of this invention can be prepared:

Example I

Approximately 46 grams of pelleted silica-alumina (87.3% $SiO_2$ by weight and 12.4% $Al_2O_3$ by weight) were placed in a steel bomb. To the bomb was added 0.5 gram of gallium chloride. The bomb was closed and heated to a temperature of 190° C. for 18 hours. The resultant catalyst contained approximately 0.25% by weight of total composition of gallium chloride.

The catalysts of this invention can be used as hydrogenation catalysts and as isomerization catalysts. However, they are particularly useful as catalysts for the polymerization of olefins. This is illustrated in the following example:

Example II

A suitable reactor was charged with the catalyst prepared in Example I. A propylene-containing hydrocarbon stream (about 75 weight percent propylene with the balance being primarly propane and other paraffins) was passed through the catalyst bed. Reaction pressure was maintained at about 1000 p.s.i.g. max. and the reaction temperature was maintained in the range from 139° C.–149° C. The space velocity was approximately 0.2 gram of propylene per gram of catalyst per hour. The liquid reaction product from the reactor was recovered and separated by fractional distillation into its various polymeric components. An 87% conversion of propylene to liquid products was obtained having the following composition:

| | Percent |
|---|---|
| $C_6$ olefins | 1.7 |
| $C_9$ olefins | 23.8 |
| $C_{12}$ olefins | 25.9 |
| $C_{15}$ olefins | 24.0 |
| Higher olefins | 25.7 |

As a comparative evaluation of the improved performance characteristics of the novel catalysts of this invention, the procedure set forth in Example II was repeated with the exception that the catalyst was the unpromoted silica-alumina pellets used to prepare the catalyst employed in Example II. Reaction conditions were substantially the same. In this case only a 60 to 75% yield of liquid products was obtained.

Any convenient method well known to those skilled in the art can be used to prepare the novel catalysts of this invention. The technique employed to impregnate silica-alumina with gallium halide in accordance with this invention is not a critical feature. Any silica-alumina support can be used to prepare the compositions of this invention. Preferably, the silica-alumina support for the novel catalysts of this invention contain predominately silica as a base constituent which is preferably in the range of 50 to 99% by weight of the support. The alumina content preferably ranges from 1 to 50 weight percent. A silica-alumina base of any range of these components is operable in the invention.

Polymerization reactions utilizing the novel catalysts of this invention can be performed with a wide variety of polymerizable olefins, such as the type which are to be found in refinery gases. The catalyst of this invention is particularly well suited to the polymerization of olefins containing from 2 to 6 carbon atoms, as for example, propylene, ethylene, butylene, pentenes and hexenes. Olefins of high molecular weight can also be polymerized utilizing the novel catalyst of this invention. The polymerization reaction can be carried out over a rather wide temperature range. Generally it is carried out at an elevated temperature. Temperatures in the range of from about 50° C. to about 150° C. are particularly useful although much higher temperatures can be used if desired. According to the process of this invention, polymerizations are best carried out in the liquid phase, although they can be carried out in the vapor phase if desired. The reaction is generally carried out at superatmospheric pressures. Pressures from about 500 p.s.i.g. to 2000 p.s.i.g. are particularly useful and much higher pressures can be used if desired. It is generally desired that the polymerization reaction be carried out in the presence of an inert diluent. Normal paraffins and cyclo paraffins are particularly preferred as inert diluents. Generally the olefin containing hydrocarbon feed stream contains from about 20% to about 90% by weight of the polymerizable olefin. In the polymerization, the liquid space velocity of the polymerizable olefin can be substantially varied. Space velocities of the order of 0.3 gram of olefin per gram of catalyst per hour have been found particularly useful. At times, space velocities as low as 0.05 and as high as 2.0 can be used if desired.

The use of the catalysts disclosed in this application as catalysts for the polymerization of olefins is claimed in copending application Serial No. 821,688, filed June 22, 1959.

What is claimed is:

1. A catalyst consisting essentially of silica-alumina containing from about 0.05 to 10% by weight of total composition of a gallium halide.

2. A catalyst consisting essentially of silica-alumina containing from about 0.1 to 5% by weight of total composition of a gallium halide.

3. The catalyst of claim 2 wherein the gallium halide is gallium chloride.

4. A catalyst consisting essentially of a silica-alumina support, wherein the support contains from about 50 to about 99% by weight of the support of $SiO_2$ and from about 1 to 50% by weight of the support of $Al_2O_3$, and from 0.05 to 10% by weight of total composition of a gallium halide.

5. A catalyst consisting essentially of a silica-alumina support, wherein the support contains from about 50 to about 99% by weight of the support of $SiO_2$ and from about 1 to 50% by weight of the support of $Al_2O_3$, and from 0.1 to 5% by weight of total composition of a gallium halide.

6. The catalyst of claim 5 wherein the gallium halide is gallium chloride.

References Cited in the file of this patent
UNITED STATES PATENTS
2,814,599     Lefrancois et al. _____ Nov. 26, 1957